(12) United States Patent
Malmros et al.

(10) Patent No.: US 7,398,638 B2
(45) Date of Patent: Jul. 15, 2008

(54) CROP UPPER PART COUNTER ROTATING STRIPPER AND STALK LOWER PART CUTTER WITH CRUSHER

(76) Inventors: Dan Malmros, Tummelbos, Levide, 620 12 Hemse (SE); Benny Nilsson, Bondarve, Levide, 620 12 Hemse (SE); Mikael Liljegren, Pajse, Martebo, 620 33 Tingstade (SE); Tommy Liljegren, Russhage, Stenkyrka, 620 33 Tingstade (SE)

(*) Notice: Subject to any disclaimer, the term of this patent is extended or adjusted under 35 U.S.C. 154(b) by 0 days.

(21) Appl. No.: 11/575,092

(22) PCT Filed: Sep. 6, 2005

(86) PCT No.: PCT/SE2005/001284

§ 371 (c)(1),
(2), (4) Date: Mar. 12, 2007

(87) PCT Pub. No.: WO2006/031174

PCT Pub. Date: Mar. 23, 2006

(65) Prior Publication Data

US 2007/0209347 A1    Sep. 13, 2007

Related U.S. Application Data

(60) Provisional application No. 60/522,304, filed on Sep. 14, 2004.

(51) Int. Cl.
*A01D 45/02* (2006.01)

(52) U.S. Cl. .......................................... 56/56

(58) Field of Classification Search ............... 56/56, 56/327.1, 13.6, 13.5, 57, 58, 121.44, 500, 56/62, 63, 14.3
See application file for complete search history.

(56) References Cited

U.S. PATENT DOCUMENTS

| 1,678,134 A | | 3/1928 | Cromer | |
|---|---|---|---|---|
| 2,343,963 A | | 3/1944 | Elliott | |
| 3,596,448 A | * | 8/1971 | Van Buskirk | 56/63 |
| 3,599,404 A | * | 8/1971 | Fernandez et al. | 56/12.8 |
| 3,952,482 A | * | 4/1976 | Quick | 56/13.9 |
| 4,035,996 A | * | 7/1977 | Fernandez et al. | 56/13.9 |
| 4,151,700 A | | 5/1979 | Gardella | |
| 4,555,896 A | * | 12/1985 | Stiff et al. | 56/13.9 |
| 4,896,486 A | | 1/1990 | Lundahl | |
| 5,031,392 A | * | 7/1991 | Baker | 56/13.9 |
| 5,129,219 A | * | 7/1992 | Baker | 56/53 |
| 5,131,216 A | * | 7/1992 | Otten et al. | 56/56 |
| 6,363,700 B1 | * | 4/2002 | Fowler | 56/13.9 |

FOREIGN PATENT DOCUMENTS

DE    19647433    5/1998

* cited by examiner

*Primary Examiner*—Árpád Fábián-Kovács
(74) *Attorney, Agent, or Firm*—Rolf Fasth; Fasth Law Offices

(57) ABSTRACT

The method is for harvesting a crop. A harvesting device (10) is provided that has an upper harvesting device (16) and a lower harvesting device (16). The upper harvesting device is in front of the lower harvesting device. The upper harvesting device detaches crop sections (24) of stalk sections (26) of crops (18). An intermediate engagement member (42) bends the stalk sections forwardly and the lower harvesting device cuts root sections (48) of the crops.

6 Claims, 2 Drawing Sheets

CROP UPPER PART COUNTER ROTATING STRIPPER AND STALK LOWER PART CUTTER WITH CRUSHER

PRIOR APPLICATION

This application is a U.S. national phase application based on International Application No. PCT/SE2005/001284, filed 6 Sep. 2005, claiming priority from U.S. Provisional Patent Application No. 60/522,304, filed 14 Sep. 2004.

TECHNICAL FIELD

The present invention relates to a harvesting device. More particularly, it relates to a harvesting device for hemp, cereals and other similar crops.

BACKGROUND OF THE INVENTION

Many different harvesting machines have been developed in the past. The conventional machines are not suitable for harvesting certain crops such as hemp, cereals and other crops and they sometimes require multiple harvesting that is time consuming and expensive to do. For example, traditional methods are still used in many countries. Pre-retting and drying take place in the field and the processing of fibers takes place in industrial plants. It is often only the long fibers that are sought after for the weaving of textiles. The shives/hurds are retted away in full and only the fibers are taken care of. This is a very labor-intensive method.

There is also a tradition of producing paper of various qualities for different applications. Normally, the seeds are first harvested with the aid of a traditional combine harvester with an elevated cutting table. After that the field is gone over once again using a chaff cutter which cuts of the remaining stalk and lay them parallel in rows in the field for pre-retting and drying. This method provides a relatively good seed yield but does not recover the stalk material at the same time. Methods have also been developed for tearing off the stalk. These methods result in great seed losses and also parts of the stalks are lost.

There is a need to an effective harvesting method that recovers more of the harvest while also being efficient. There is a need for a method that enables the harvesting of the crop while limiting waste and also enables the cutting of the stalk sections without having to go over the field a second time.

Also, for the purpose of spreading harvested material evenly, the predominant method is to mechanically spread the material using centrifugal power. The width of harvesting equipment has increased considerably during recent years, and hence the material has a longer way to go sidewise in order to cover the area properly. The increased length makes this operation more sensitive to wind. The uneven spread makes the soil improvement less efficient.

SUMMARY OF THE INVENTION

The method of the present invention provides a solution to the above-mentioned problems. More particularly, the method is for harvesting a crop. A harvesting device is provided that has an upper harvesting device and a lower harvesting device. The upper harvesting device is disposed in front of the lower harvesting device so that it extends beyond the lower harvesting device. The upper harvesting device can also be lowered to the same level, and in some cases also even below, as the lower harvesting device in order to harvest any kind of crop. The upper harvesting device strips or detaches the (seed, flower and leaf) crop sections from the stalk sections of the crops. An intermediate adjustable engagement member may be used to bend the stalk sections forwardly before the lower harvesting device cuts root sections of the crops. The method also includes steps for spreading the material evenly over the harvested area.

DETAILED DESCRIPTION

Figure 1:
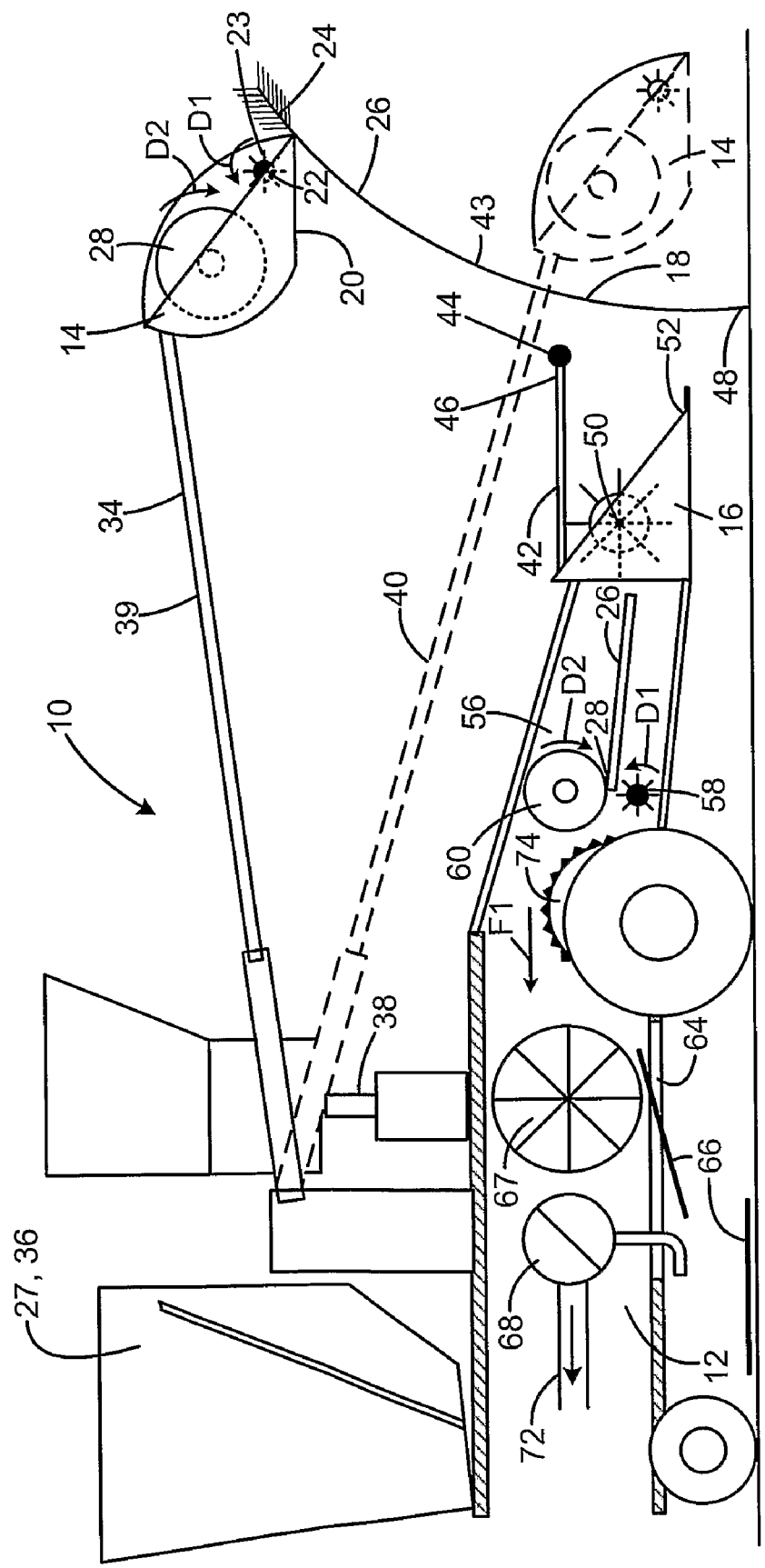
FIG. 1 is a schematic cross-sectional side view of the harvesting device of the present invention.
Figure 2:
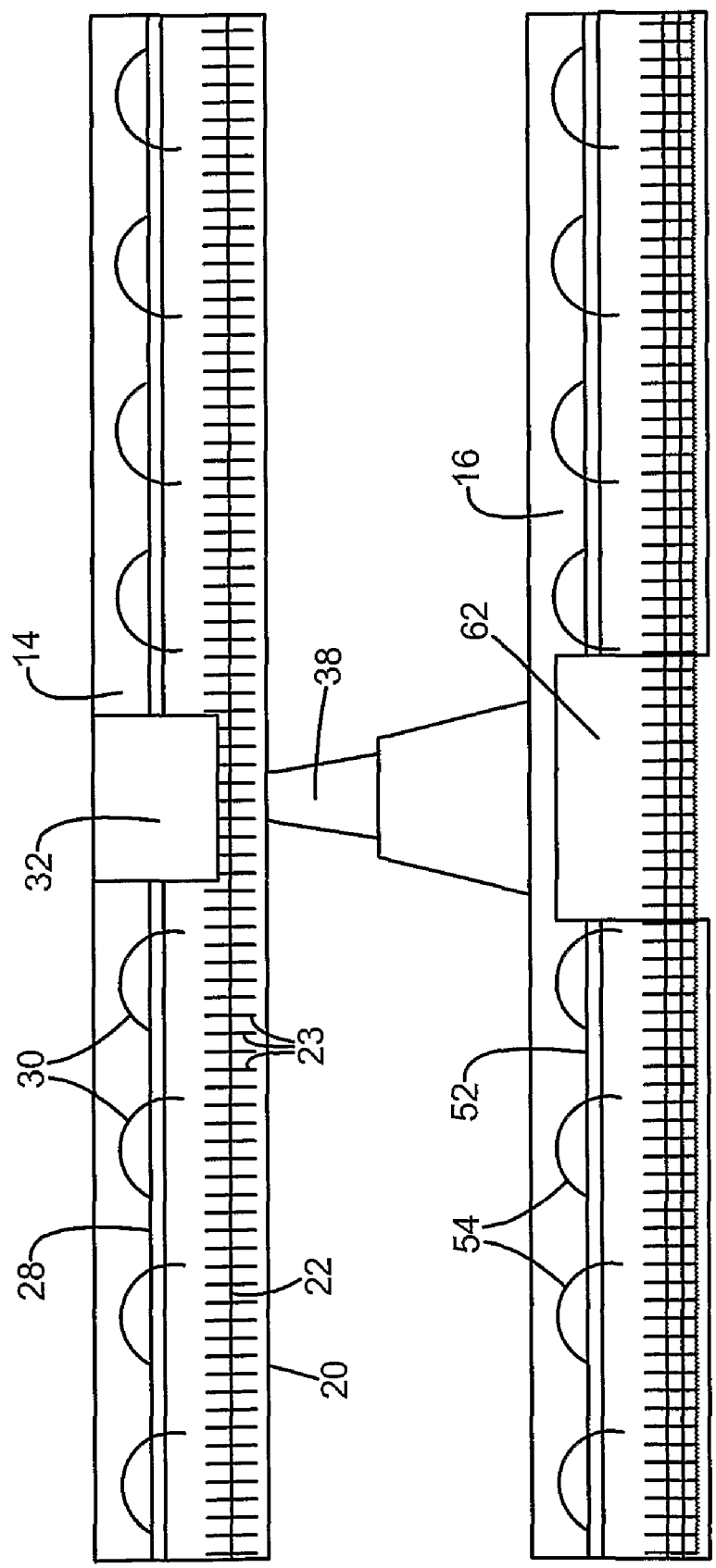
FIG. 2 is a schematic front view of a portion of the harvesting device shown in FIG. 1.

With reference to FIGS. 1-2, a harvesting device 10 of the present invention is shown. The device 10 has a driving unit 12 and an upper harvesting unit 14 and a lower harvesting unit 16 for harvesting a crop 18 such as hemp, cereals or any other suitable crop.

The upper harvesting unit 14 has a table 20 above with a rotating stripper header 22 with outwardly protruding fingers 23 are disposed. Preferably, the header is rotating in a counter-clockwise direction (D1) to strip or detach crop sections 24 from stalk sections 26 of the crop 18. In this way, the crop sections 24 may be detached or removed from the stalk sections without cutting the stalk sections and before the stalk sections are bent. It should be noted that the removal of the crop is performed while the stalk sections 26 are still standing. The crop sections may contain seeds, flowers and leaves. A rotatable elongate feed screw 28 with helical edges 30 may be used. The screw may rotate in a clockwise direction (D2) to guide the crop sections 24 towards a mid-portion 32 of the harvesting unit 14. In the alternative, if the crop sections contain seeds, the harvesting unit 14 may be provided with an optional sieve that permits the seeds to fall therethrough into a container 27 disposed below and behind the screw 28 of the upper harvesting unit 14, via a conveyor belt.

The mid-portion 32 cooperates with a rotatable endless conveyor belt 34 that conveys the remaining crop sections 24 to a receiver 36 for storing the detached crop sections 24. There may be a second conveyor belt that conveys the crop sections from the belt 34 to the top of the receiver 36. The conveyor belt 34 rests on a hydraulic rod 38 that may be used to raise and lower the belt 34 so that the belt 34 and thus the unit 14 are movable between a raised position 39 and a lowered position 40 so that the height of the unit 14 may be adjusted to the height of the crop sections 24 relative to the ground.

The device 10 has an intermediate member 42 that may be horizontal and protrude forwardly. The member 42 may have an engagement member 44 attached at a forward edge 46 of the member. One function of the member 42 is to urge the stalk section 26 forwardly so as to slightly bend the stalk section forwardly so that the stalk sections 26 are bent forwardly and the already harvested crop sections 24 are disposed ahead or in front of the root sections 48 of the crop. Because the harvesting unit 14 extends beyond the engagement member 44, the crop sections 24 are already removed by the time the engagement member 44 engages a mid-portion 43 of the stalk section 26 to bend the stalk sections 26 forwardly to make it easier to later cut the stalk sections at the root sections 48. The method of the present invention is especially adapted for crops taller than around one meter.

The device 10 also has the lower harvesting unit 16 that includes a rotatable knife device 52 with helical edges 54 for cutting the root section 48 of the crop 18 and a rotatable guiding unit 50 guides the root sections 48 of the cut stalk sections 26 into a chamber 56 to encounter a crusher 58 that may rotate in the counter-clockwise direction (D1) and a rotatable guiding unit 60 may rotate in the clockwise direction (D2) so that the stalk sections 26 may be crushed therebetween into elongated flattened pieces 66. The crushed or flat pieces dry faster than the cut stalk sections. By regulating the speed of the rotating guiding units 58 and 60 the airiness and the density of the pieces can be controlled and adjusted to the desired dryness level and to also minimize the volume. It is also possible to adjust the guiding units 58 and 60 to the method used to gather the pieces. The flat pieces 66 may also be guided towards a mid-section 62 of the harvesting unit 16 and backwardly, as shown by an arrow F1, and be permitted to fall through an opening 64 defined in an underside of the unit 12 so that the flattened elongate pieces 66 are lined up in a parallel direction compared to the direction of the harvesting device 10.

Behind the crusher 58 the rotatable guiding unit 60 the material may be chopped into small pieces for several purposes; one is for the spreading off the material evenly over the whole area harvested to be used for soil improvement and in order to facilitate soil treatment. More particularly, the device 10 may have a hacker 74 for hacking or grinding the chopped material or stalk sections into small pieces and a fan member 67 for moving the chopped material rearwardly and a valve device 68 with a downwardly and backwardly extending tube 70 and a backwardly directed conduit 72 for evenly spreading the chopped material on the field. The velocity and direction of the tube may be adjusted.

The function also allows for collecting the material in a container behind the unit 10. The chopped material may be transported with the help of adjustable airstreams produced by an accelerator-fan. The air-stream is adjustable with reference to the actual need that saves energy. The factors taken into consideration are which mode is chosen, the amount of material, and the area which the material is spread over. These air-streams may also be used for the purpose of evenly spreading the material over the harvested area. This method of spreading the material can also take into consideration such factors as wind conditions, by adjusting air-stream velocity and direction to compensate for wind drift. The alternative use of function may be taken care of by a valve. One feature of the spreading of the material is that the material may be used to fertilize the soil since some crops such as hemp has fertilizing properties.

An important feature is that the upper harvesting unit 14 extends more forwardly than the member 42 and the lower harvesting unit 16 so that the crop sections 24 can be removed before the stalk sections 26 are bent forwardly slightly. In this way, there is less risk that the crop falls to the ground when the stalk sections are bent. The crop sections 24 are thus removed before the stalk sections are bent forwardly and the root sections 48 are cut. The crop sections 24 may be harvested with reduced risk of spilling the crops on the ground and the stalk sections 26 may be cut at the root section 48 without having to drive the harvesting device 10 a second time on the crop field. The stalk sections 26 may be cut at different levels to leave higher stubble to improve aeration and make the quality more even. More particularly, a middle stubble that is about one meter wide, which corresponds to the width of the string of the stem that leaves the machine, may be left taller than the surrounding and also be cracked, with the help of girder iron, to keep the material left for effective drying and/or ultraviolet-and dew retting alleviated. This process may be used to dry the material more effectively and produce a better quality product. This method also leaves less material left in the field compared to conventional methods.

While the present invention has been described in accordance with preferred compositions and embodiments, it is to be understood that certain substitutions and alterations may be made thereto without departing from the spirit and scope of the following claims.

The invention claimed is:

1. A method of harvesting a crop, comprising:
providing a harvesting device (10) having a crop harvesting device (14) and a stalk cutting device (16), the crop harvesting device being in front of the cutting device, the crop harvesting device detaching crop sections (24) of stalk sections (26) of crops (18),
an intermediate member (42) bending the stalk sections forwardly,
the cutting device cutting root sections (48) of the crops,
the stalk cutting device (16) crushing the cut stalk sections to reduce a diameter of the stalk sections and breaking the stalk sections diagonally in order to improve aeration, and providing the crop harvesting device with a stripper header (22) that rotates in a counter-clockwise direction (D1) and a guide member (28) that rotates in a clockwise direction (D2).

2. The method according to the claim 1 wherein the method further comprises permitting the crushed stalk sections to fall through an opening (64) of the harvesting device (10).

3. The method according to the claim 1 wherein the method further comprises adjusting a height of the crop-harvesting device with a lifting mechanism (38).

4. The method according to the claim 1 wherein the method further comprises conveying the stalk sections (26) so that the root sections (48) engages a crusher (58) and a guide member (60).

5. The method according to the claim 1 wherein the method further comprises the engagement member (42) engaging a mid-portion (43) of the stalk sections (26) prior to the stalk cutting device (16) cutting the root sections (48).

6. The method according to claim 1 wherein the method further comprises spreading cut stalk section evenly over a field.

* * * * *